(12) United States Patent
Hori et al.

(10) Patent No.: US 7,672,821 B2
(45) Date of Patent: Mar. 2, 2010

(54) COMPUTER READABLE MEDIUM HAVING A PROGRAM USING PARTICLE METHOD

(76) Inventors: Akio Hori, Ichinodai 155-67, Tsukuba, Ibaraki Pref. (JP) 305-0073; Hiromi Kojo, Bunkyo-cho 17-22-1011, Tsuchiura, Ibaraki Pref. (JP) 300-0045

( * ) Notice: Subject to any disclaimer, the term of this patent is extended or adjusted under 35 U.S.C. 154(b) by 0 days.

(21) Appl. No.: 12/218,637

(22) Filed: Jul. 18, 2008

(65) Prior Publication Data
US 2009/0024376 A1 Jan. 22, 2009

(30) Foreign Application Priority Data
Jul. 18, 2007 (JP) ............................. 2007-211559

(51) Int. Cl.
*G06G 7/48* (2006.01)
(52) U.S. Cl. ................. 703/6; 703/2; 345/419
(58) Field of Classification Search ................ 703/6
See application file for complete search history.

(56) References Cited

U.S. PATENT DOCUMENTS

| 5,796,400 | A | * | 8/1998 | Atkinson et al. ............ 345/420 |
| 6,161,080 | A | * | 12/2000 | Aouni-Ateshian et al. .... 703/11 |
| 6,718,291 | B1 | | 4/2004 | Shapiro |

FOREIGN PATENT DOCUMENTS

| JP | 3242811 | 10/1996 |
| JP | 2692668 | 6/1997 |
| JP | P2001-27470 | 8/2002 |
| JP | P2007-211559 | 8/2007 |

OTHER PUBLICATIONS

Donev et al, "Hypoconstrained Jammed Packings of Nonspherical Hard Particles: Ellipses and Ellipsoids" cond-mat/0608334, Aug. 2006.*
Donev et al, "Neighbor List Collision-Driven Molecular Dynamics Simulation for Nonspherical Hard Particles. II. Applications to Ellipses and Ellipsoids", Journal of Computational Physics 202, pp. 765-793, 2005.*

(Continued)

*Primary Examiner*—Paul L Rodriguez
*Assistant Examiner*—Mary C Jacob

(57) ABSTRACT

Finite element methods are unsuitable for a dispersed system. Particle methods suitable for a dispersed system are limited in their particle shapes of only spheres that require many particles to model a complicated shape especially in 3D. Proposed procedures for a particle method are roughly as follows. 1): Judging the existence of the contact between particles as that between mathematically-smooth closed surfaces representing particle shape and size. 2): Assuming an imaginary contact point and an imaginary contact plane the same as when both closed surfaces are reduced with the same scale to touch at one point. 3): Calculating imaginary contact area and imaginary contact stiffness using the above point and plane. Based on these procedures, particle shapes are not limited but smooth. Therefore, a more complicated shaped problem in a dispersed system can be analyzed with a smaller number of particles. Additionally, combined use with finite elements enlarges usability.

13 Claims, 2 Drawing Sheets

OTHER PUBLICATIONS

Matuttis et al, "Discrete Element Simulations of Dense Packings and Heaps Made of Spherical and Non-Spherical Particles", Powder Technology, vol. 109, No. 1-3, 2000.*

Favier et al, "Shape Representation of Axi-Symmetrical, Non-Spherical Particles in Discrete Element Simulation Using Multi-Element Model Particles", Engineering Computations, vol. 16, Issue 4, pp. 467-480, 1999.*

S. Koshizuka, Particle Method, 2005, Maruzen, Tokyo [p. 3, p. 10, p. 13, p. 60].

* cited by examiner

COMPUTER READABLE MEDIUM HAVING A PROGRAM USING PARTICLE METHOD

CROSS-REFERENCE TO RELATED APPLICATIONS

The present application claims the benefit of patent application number 2007-211,559, filed in Japan on Jul. 18, 2007, the subject matter of which is hereby incorporated herein by reference.

FEDERALLY SPONSORED RESEARCH

Not Applicable

SEQUENCE LISTING OR PROGRAM

Not Applicable

BACKGROUND

1. Field of the Invention

The present invention relates to a computer program for the particle method in a broad sense, in which objects are modeled into (or using) particles whose displacements and/or deformations can be calculated, if necessary, considering transmission (or exchange) of force, heat or material between the touched particles.

2. Description of Related Art

In the finite element method (FEM), mainly physical relations between the elements are described as relations between the nodes by dividing the continuum into piecewise elements enclosed with the nodes. Therefore, analysis of a contact-involving problem using FEM requires treatment. For example, the treatment is a procedure to calculate force to compensate the element overlap (Japan Pat. No. 2,692,668), generating new elements between the touched surfaces (Japan Pat. No. 3,242,811), or imaging a touching plane with the averaged normal direction of both front planes on both elements (Japan Pat. Application No. 2001-27,470).

However, FEM using the treatment is fundamentally unsuitable for a dispersed system, because FEM is naturally for the continuum and treats partial contact between discontinued elements. Moreover, for instance with rectangular solids, the contact has various modes of not only plane-to-plane, but also plane-to-corner, ridge-to-ridge, and transition between them. Therefore, it is difficult to take account of these complex modes using FEM.

On the other hand, the particle method is fundamentally suitable for an analysis of a dispersed system. However, the particle shape is limited in sphere or no shape at present (for example, "Particle method", S. Koshizuka, 2005,, Maruzen, Tokyo, in Japanese). Therefore, there is a problem of requiring a large number of particles in modeling of a complicated shape using the particle method particularly in three dimensions (3D). Moreover, even if a large number of particles are used, there is a problem in that microscopic shape of the particles is remained and decides microscopically the contacting direction between assemblies of the particles.

In the mesh-free method, U.S. Pat. No. 6,718,291, discloses representing a geometry using implicit functions, representing the boundary conditions using similar functions, and solving coefficients of interpolating functions between these functions. However, the mesh-free method is based on the continuum and difficult to apply to a strongly nonlinear problem or shape changes.

OBJECTS AND SUMMARY

It is an object of the present invention to provide a numerical analytical method for a dispersed system in which contact and detachment are repeated and make FEM unsuitable. It is another object of the present invention to provide an accurate contact model between the particles with a smooth surface unlimited to sphere, and provide an analytical method for a more complicated shaped problem with less number of particles. It is still another object of the present invention to allow analytical coexistence of the particles and the finite elements that are for a continuum portion, and also to allow large deformation of each particle.

According to the present invention, a computer program using the particle method includes the following procedures. (1): Judging the existence of the contact between particles as that between mathematically-smooth closed surfaces representing particle shape and size. (2): Assuming an imaginary contact point and an imaginary contact plane the same as when both closed surfaces are reduced (or enlarged) with the same scale to touch at one point. (3): Calculating imaginary contact area and imaginary contact stiffness etc. using the point and the plane of the imaginary contact.

Based on these procedures, particle shapes are not limited but smooth (and usually closed) on the surfaces. Therefore, a more complicated shaped problem in case of a dispersed system or portion can be analyzed with less number of particles. Additionally, large deformation analysis and a combined use with FEM are capable.

REFERENCE NUMERALS

Figure 1:
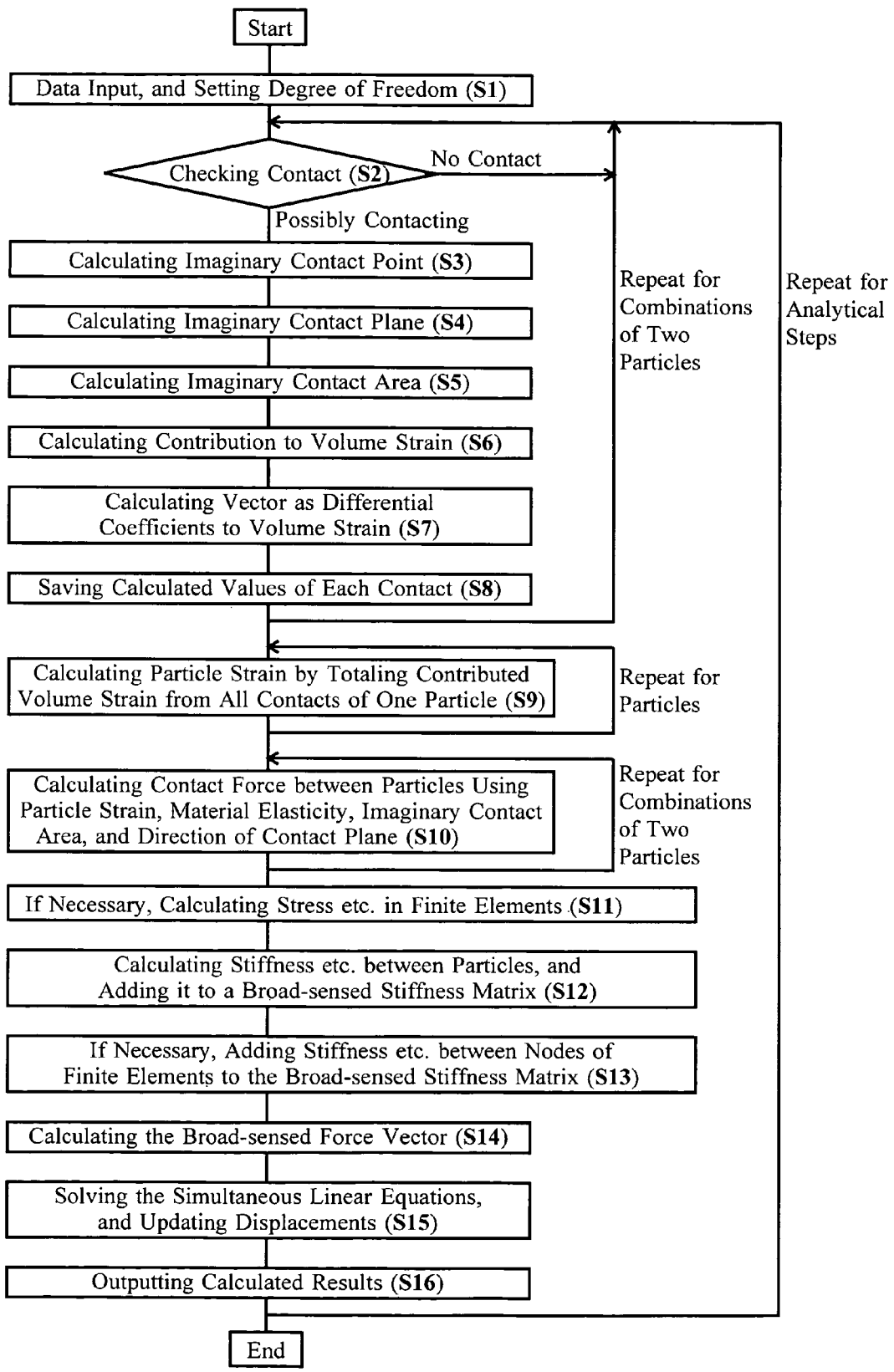
FIG. 1 is an overall flowchart in accordance with one embodiment.

11 and 12: reduced (or enlarged) closed-surface for particles A and B, respectively

13 and 14: closed-surface for particles A and B, respectively

21 and 22: center point of particles A and B, respectively

31: imaginary contact point (assumed point before convergence)

41: imaginary contact plane

51 and 52: distance to a imaginary contact plane from a center point of particles A and B, respectively, (showing also normal vector and normal vector direction at a imaginary contact point)

DETAILED DESCRIPTION OF THE INVENTION

The invention enables unlimited particle shapes not only to be a sphere in the particle method. First, the invention includes setting a mathematically-smooth (and usually closed) surface for each particle shape and size, and judging existence of contact between two particles as that between two mathematically-smooth surfaces. Contact of two mathematically-smooth surfaces will be basically limited at one point under a very high probability and simplifies the contact mode. Strictly, although two surfaces can contact rarely at two or more points, the usual contact at only one point is assumed for the invention. Moreover, the surfaces are usually closed surfaces; however some surfaces may be unclosed for modeling the boundary condition with particles, and may be closed inside out for analyzing internal contact to the surfaces.

Next, to calculate displacements of a non-sphere particle, it is required to determine a point of action of contact force between two particles. Therefore, the invention provides uniquely an imaginary contact point between two particles under the judged contact condition, which is the same point as when both the closed surfaces are reduced isotropically with the same scale to touch at one point. Without the above procedure, for instance, the following problem can occur. If two ellipsoids with arbitrary radial lengths are placed in arbitrary 3D-directions and overlapped in an arbitrary portion, intersection of both ellipsoidal surfaces shows a very complicated anti-planar closed curve mathematically, making construction of analytical process very difficult. On the other hand, the present procedure enables to shrink the overlapped portion of both closed surfaces up to one point using the numerically-calculated same scale for both closed surfaces, being very helpful to the construction of analytical process. Moreover, the present procedure provides another merit, wherein shapes of the closed surfaces are not limited to special shapes like an ellipsoidal surface and particle shapes can be more free such as quite different shapes between contacted particles.

To calculate displacements of a non-sphere particle, it is required also to determine the direction of contact force between two particles. Therefore, the invention provides uniquely an imaginary contact plane between two particles under the judged contact condition, which is the plane to contain the imaginary contact point and to have a same-directional perpendicular as both normal vectors on both the reduced closed surfaces at the imaginary contact point. Because, both the reduced closed surfaces contact at one point (the imaginary contact point) and have the same-directional (including 180, degrees reverse) normal vectors at this one point.

Using the imaginary contact point and the imaginary contact plane, the imaginary contact area can be defined. For example, the imaginary contact area can be calculated as follows: (1) defining both particle volumes using each particle size or data; (2) calculating two tentative values for the imaginary contact area, as one-half of each particle volume divided by a distance L from the center of each particle to the imaginary contact plane; and (3) choosing the smaller one from the two tentative values as the imaginary contact area.

Using the imaginary contact point and the imaginary contact plane and the imaginary contact area, can simplify calculating the characteristic values or matrix between both contact particles, which are stiffness, transmission resistance, transportation resistance, or these inverses. For example, if the third particle do not exist, axial stiffness between both particles can be calculated from portion stiffness of each above-defined distance L, wherein the stiffness is calculated as the product of material stiffness of each particle and the imaginary contact area divided by each distance L.

Using the characteristic values or matrices between both contact particles; calculating the characteristic matrix between degrees of freedom (DOFs) of most of particles; and solving the simultaneous usually-linear equations similarly to FEM; it is possible to calculate translational or rotational displacements or displacement increments of most of particles. As described above, the present invention enables calculation including non-sphere particles.

The present invention may be constructed and coupled with FEM. Specifically, the procedure may include: (1) setting some or most of translational or rotational DOFs of particles being equal to DOFs of finite element nodes; and (2) adding part or most of the characteristic matrix between DOFs of particles, into a (broad-sensed) stiffness matrix calculated by usual FEM. Accordingly, the present invention is not alternative to FEM and can easily coexist with FEM and enables coupled analyses with FEM. The present invention enables more wide-applicable and/or more precise calculations with finite elements of continuous portions of analytical figures, using also the past program stocks effectively if possible.

The imaginary contact point and the reducing scale for both mathematically-smooth closed surfaces can be calculated numerically. Although the reducing scale is single scalar and seems probably to be calculated earlier than the imaginary contact point, the contact of both closed surfaces at only one point tends to require a certain discriminant of simultaneous multivariable equations of high degree. Therefore, the procedure to calculate the reducing scale requires an idea. One strategy is as follows. (1): Assuming a temporary point for the proper imaginary contact point. (2): Reducing or enlarging both closed surfaces isotropically with different scales to pass the assumed temporary point respectively, and calculating both normal vector directions and both local curvatures on the reduced or enlarged both closed surfaces at the assumed temporary point. (3): Shifting the position of the assumed temporary point to eliminate the difference of both normal vector directions and the difference of both reducing or enlarging scales, using both the local curvatures. (4): Repeating the above sub-steps (2) and (3) as convergence calculation until the difference of both normal vector directions and the difference of both reducing or enlarging scales decrease within allowable values. Using the convergence calculation, the position of the assumed temporary point can be converged to the position of the imaginary contact point, and at the same time the reducing scale and the normal vector direction are obtained with convergence. As mentioned above, the present invention can include concrete steps to enable numerical calculations of the imaginary contact point as a unique point.

In the present invention, the above strategy of convergence calculation can be applied to judging existence of contact between neighbor particles. Generally it is rather difficult to examine existence of the solutions of the simultaneous multivariable equations of high order using a certain discriminant. Therefore, it is very effective using the above strategy of convergence in order to judge existence of contact based on the converged reducing (or enlarging) scale, especially for non-easy judgments. The contact is assumed only when the reducing (sometimes enlarging) scale is less than 1.0, (sometimes about 1.0) between two particles that cannot (sometimes can) transmit tensile force. As mentioned above, the present invention can include steps to enable more precise judgment of the contact existence numerically.

In the present invention, particles can have DOFs about radiuses, radius-changes or radius-change rates that represent or indicate the sizes of the closed surfaces in 3D-directions. Constructing particle radius-changes into DOFs enables to simulate large changes of particle sizes (and their influences) directly in the overall analyses. In FEM generally, element strains are determined from nodal displacement differences and are not required to classify small strains and large strains especially. On the contrary in the particle method with certain particle sizes, rather small strains by particle overlaps of contacts have different meaning from rather large strains by particle deformations as size and/or shape changes. As mentioned above, the present invention can allow particle radius-changes and enables to simulate large deformations such as liquid flow or solid plasticity under incremental analysis. Herein, the radius-changes are enabled by non-sphere (almost free) particle shapes of the closed surfaces. Additionally on the other hand, if simply fixing some of particle DOFs about radius-changes in the input data, the invention can conveniently introduce plane strain into particles.

In the present invention, a vector as the product of the characteristic matrix and the particle DOFs vector, (that is, a vector analogous to a broad-sensed force vector in FEM,) can have elements with physical quantity as deviation stresses at rows of DOFs about the radiuses, the radius-changes or the radius-change rates. Because the force-analogous vector must be already known before solving simultaneous linear equations and calculating particle displacements, one of analytical important points is what physical quantity should be for rows of particle DOFs of the radius-changes in the force-analogous vector. However, for example, using deviation stresses for the physical quantity enables modeling some of liquid flow with particle shape-changes. Moreover, plastic deformations in a solid are caused by deviation stresses generally. As these reasons, the invention can place deviation stresses to the physical quantity, and can help to simulate various phenomenon over the radius-changes.

In the present invention, particle strains can be calculated. Generally, a FEM element has strong independence and enables to calculate strains from the nodal displacements, however, in a particle method, particle strains cannot be calculated from contacted only two particles, because the number of contact with one particle is not limited. Therefore, the present invention can include the steps of (1): calculating strain contributions to both contacted particles using the reducing scale; and (2): calculating strain in each particle as a scalar or vector total of the contributed strains of all contact with the neighbor particles. These steps enable appropriate calculations of particle strains under contact.

In the present invention, forces between particles can be calculated. Part or most of contact force between particles can be easily calculated using the above-mentioned particle strains, the imaginary contact point, the normal vector direction, the imaginary contact area and mechanical properties of particle materials.

The present invention, having been described mainly for 3D, is basically applicable to a planar analysis also, if deleting one dimension and replacing the planes with lines. The replacing is almost merely about the closed surfaces with closed curves and about the contact planes with contact lines.

DETAILED DESCRIPTION OF THE INVENTION—A PREFERRED EMBODIMENT

Figure 2:
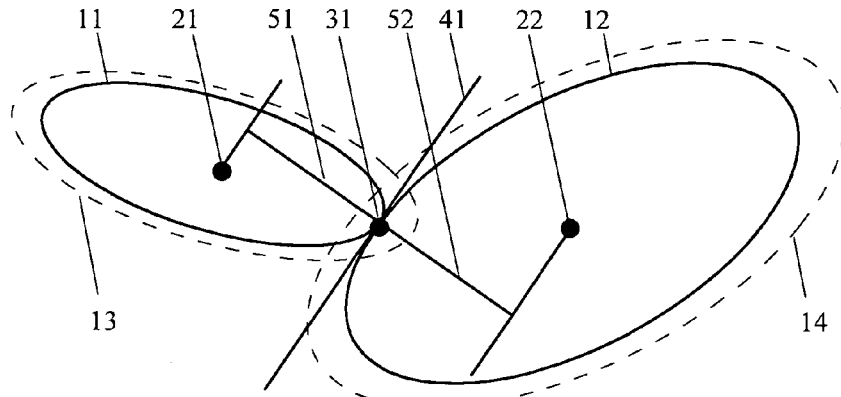
FIG. 2 shows a concept of imaginary contact in the present invention.
Figure 3:
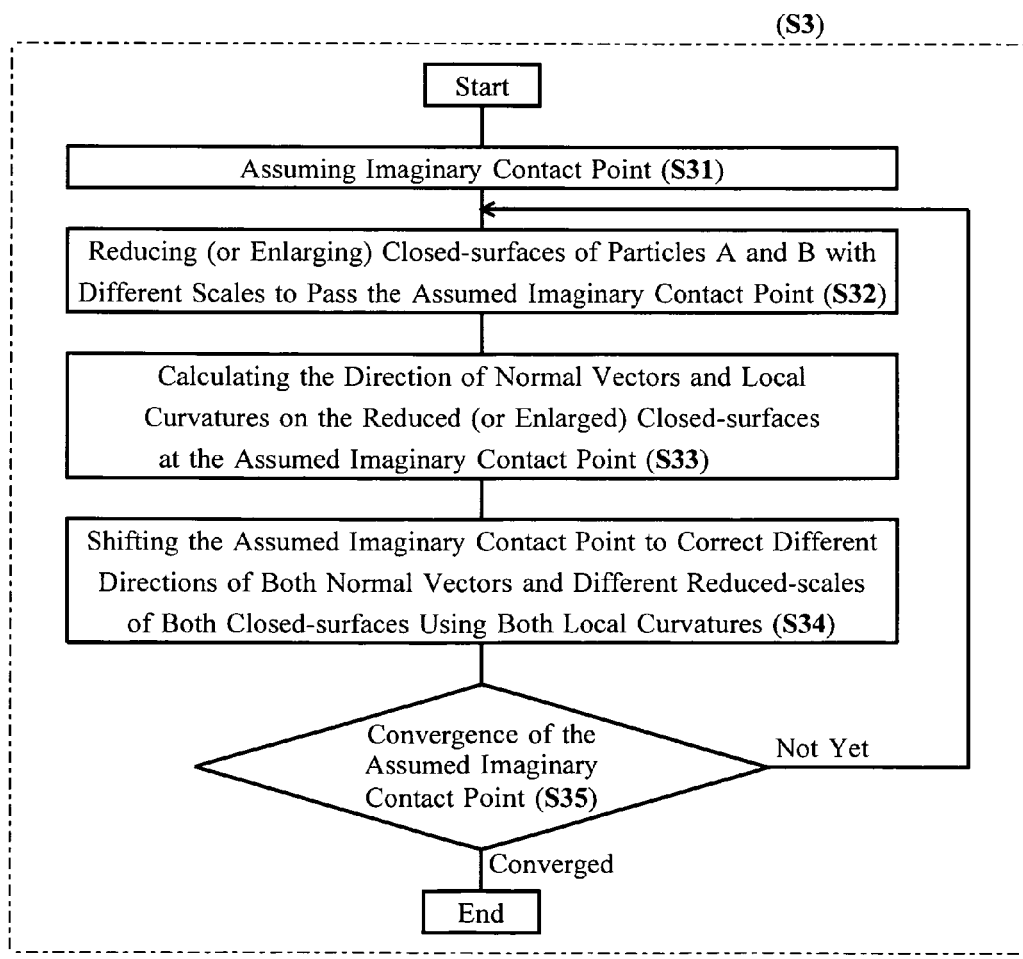
FIG. 3 is a flowchart of a calculation of an imaginary contact point.

A preferred embodiment of the present invention will be explained below using FIGS. 1 to 3. FIG. 1 shows the overall flowchart of a program in accordance with one preferred embodiment. Hereafter, the explanation will follow the flow sequence. First, input data is acquired (S1 in FIG. 1). The acquisition can be from existing files or through input devices. The input data contains values of each particle, for example, center coordinates, three radiuses, directions of the radiuses, a function type to define the closed surface, initial speed, material physical properties, temperature, and electric charge. However, shape of the closed surface is mathematically-smooth. To be applicable for large deformation analyses, radius-change rates of the particles are set into DOFs of the overall analysis (S1). Elements of a vector analogous to a broad-sensed force vector have physical quantity of deviation stresses at rows of DOFs of the radius-change rates.

Next, existence of contact between neighbor particles is judged as existence of contact between the closed surfaces (S2). For particles under the judged contact condition, the later steps (S3-S8) are executed. However, if the judgment is difficult within some simple calculations, this judgment is transferred into the following step (S3) to calculate the imaginary contact point.

Calculation of the imaginary contact point (S3) obeys the following convergence calculation. FIG. 2 shows the concept of contact, and FIG. 3 shows a flowchart to calculate the imaginary contact point (S3). First, a temporary point 31 is assumed for the proper imaginary contact point (S31 in FIG. 3). Closed surface 13 of particle A and closed surface 14 of particle B are reduced (or enlarged) isotropically with different scales to pass the assumed temporary point 31 respectively (S32). On the reduced (or enlarged) both closed surfaces 11 and 12 of particles A and B respectively, both normal vector directions 51 and 52 and both local curvatures are calculated at the assumed temporary point 31 (S33). Because the both normal vector directions 51 and 52 are rarely parallel in the converging halfway process, the position of the assumed temporary point 31 is shifted to eliminate the difference of the both directions (S34). Quantity in shifting can be calculated easily, because the local curvatures signify the partial differentials of the normal vector directions with respect to the assumed temporary point 31. At the same time, the assumed temporary point 31 is shifted along the normal direction to eliminate the difference of both reducing (or enlarging) scales for both closed surfaces (S34). The above steps (S32-S34) are repeated as convergence calculation until the difference of both normal vector directions 51 and 52 and the difference of both reducing (or enlarging) scales decrease within allowable values (S35). After convergence, the assumed temporary point 31 becomes the imaginary contact point, also 31. In the pre-mentioned case of transferring the contact judgment from step S2 into step S3, the contact is judged positive under the reducing (or enlarging) scale less than 1.0, or nearly 1.0, after convergence.

Next, the imaginary contact plane is calculated (S4). The imaginary contact plane 41 is defined to contain the imaginary contact point 31 and to have a same-directional perpendicular as both normal vector directions 51 and 52 after converged.

The imaginary contact area is calculated in the following process (S5). First, distances 51 and 52 respectively from both centers 21 and 22 of both particles A and B to the imaginary contact plane 41 are calculated. Next, temporary contact areas SA and SB that are estimated mainly from one of both particles A and B, respectively, are given as one half of the volumes VA and VB of both particles A and B divided by the distances 51 and 52. The imaginary contact area is given as the smaller one of SA and SB. The reason to choose the smaller one is because other particles can contact on the surplus area of the larger one.

Next, contribution to the volume strain is calculated (S6) basically from the reducing (or enlarging) scale obtained after converging in step S3. Additionally, influence of difference of material stiffness of particles A and B and the difference of the areas SA and SB may be also considered to calculate the contribution. Next, an influence coefficient vector to the volume strain is calculated (S7). The influence coefficient vector is defined as the partial differentials of the contribution to the volume strain with respect to particle DOFs of translations, rotations and radius-change rates. Though the calculation process is somewhat complicated, the influence coefficient vector can be calculated numerically through sequential calculations of the partial differential coefficients with respect to the DOFs, about the formulas of the imaginary contact point 31, the normal vector directions and the distances 51 and 52, and the areas SA and SB.

Calculated main results in the above steps S3 to S7 are saved into a memory (or storage) device (S8). The steps S3 to S8 are repeated about all combinations of two particles under the judged contact condition.

The contributed volume strains calculated in step S6 are read from the devices and totaled about all contacts around each particle, to compute the volume strain of each particle. The totaling method, which is preferably scalar for fluids and preferably vector for solids, is according to the analytical purpose (S9).

Contact force between two particles is calculated (S10) using the imaginary contact point 31, the normal vector directions 51 and 52, and the imaginary contact area calculated in steps S3 to S5, the volume strains calculated in step S9, and material stiffness of the particles. Friction force etc. between particles can be calculated separately and added into the contact force. Moreover, not only forces but also transfers of heat, material and/or charge between particles may be calculated. Calculations are carried about all combinations of two particles under the judged contact condition.

If there is a finite element, element stress etc. are calculated. Inertia forces and/or electromagnetic forces to the particles or elements can be also calculated, if necessary (S1).

Next, the influence coefficient vectors to the volume strain calculated in step S7 are read from the devices, and using formulas of the contact force between particles used in step S10, stiffness etc. between particles are calculated and added to the broad-sensed stiffness matrix. Additionally, using the partial differentials of the contact force except the volume strain portion with respect to particle DOFs of translations, rotations and radius-change rates; stiffness etc. between particles from the differentials are calculated and added to the broad-sensed stiffness matrix similarly (S12). The broad-sensed stiffness matrix may contain friction or transfer resistance of heat, material or charge between particles.

If there is a finite element, element stiffness etc. are calculated and added to the broad-sensed stiffness matrix. If necessary, stiffness of distant force etc. to the particles and elements are calculated and added (S13).

The broad-sensed force vector is calculated (S14). Solving the simultaneous linear equations, the incremental solution is calculated about particle DOFs of translations, rotations and radius-change rates and sometimes about element nodal DOFs (S15). Calculated data of the results of displacements and stresses. etc. is output to the files in the devices (S16). Output is allowed also in other steps. The above steps S2 to S16 are repeated for the incremental analysis. Output files can be used to display the requested figures or values on the screen or print on paper using different programs.

What is claimed is:

1. A computer readable storage medium having a computer-executable program to simulate physical or chemical phenomena with one or more non-spherical particles and with or without spherical particles and to calculate translational or rotational displacements of particles, comprising the steps of:
   (a) judging existence of contact between neighbor particles as existence of contact between mathematically-smooth closed surfaces representing each particle shape and size;
   and the following (b) to (e) between two particles under the judged contact condition,
   (b) assuming an imaginary contact point uniquely the same as when both the closed surfaces are reduced isotropically with the same scale to touch at one point;
   (c) assuming an imaginary contact plane to contain the imaginary contact point and to have a same-directional perpendicular as both normal vectors on both reduced closed surfaces at the imaginary contact point;
   (d) calculating imaginary contact area using the imaginary contact point and the imaginary contact plane;
   (e) calculating characteristic values or matrices between both contact particles about stiffness, transmission resistance, transportation resistance or these inverse, using the imaginary contact point, the imaginary contact plane and the imaginary contact area; and
   (f) based on the characteristic values or matrices between both particles, calculating a characteristic matrix between degrees of freedom of many particles, solving simultaneous linear equations, and calculating translational or rotational displacements or displacement increments of the particles;
   and the following sub-steps (g) to (j) in the details of the above step (b),
   (g) assuming a temporary point for the imaginary contact point;
   (h) reducing or enlarging both closed surfaces isotropically with different scales to pass the assumed temporary point respectively, and calculating both normal vector directions and both local curvatures on the reduced or enlarged both closed surfaces at the assumed temporary point;
   (i) shifting the position of the assumed temporary point to eliminate the difference of both normal vector directions and the difference of both reducing or enlarging scales using both the local curvatures; and
   (j) repeating the above sub-steps (h) and (i) as convergence calculation until the difference of both normal vector directions and the difference of both reducing or enlarging scales decrease within allowable values.

2. A computer readable medium having a computer-executable program according to claim 1, wherein the details of the above step (a) include a sub-step of:
   judging the contact positive, only when reducing or enlarging scale after convergence calculated using the same sub-steps as the above sub-steps (g) to (j) is less than 1.0 or less than approximately 1.0.

3. A computer readable medium having a computer-executable program according to claim 1, wherein particles have degrees of freedom about radiuses, radius-changes or radius-change rates that represent or indicate the sizes of the closed surfaces in three-dimensional directions.

4. A computer readable medium having a computer-executable program according to claim 3, wherein a vector as a product of the characteristic matrix and a vector corresponding to the degrees of freedom of particles, that is, a vector analogous to a broad-sensed force vector in a finite element method, has elements with physical quantity as deviation stresses at rows of degrees of freedom about the radiuses, the radius-changes or the radius-change rates.

5. A computer readable medium having a computer-executable program according to claim 1, further comprising the steps of:
   calculating strain contributions to both contacted particles, based on the reducing scale applied in the above step (b); and
   calculating strain in each particle as a scalar or vector total of the contributed strains of all contact with the neighbor particles.

6. A computer readable medium having a computer-executable program according to claim 5, further comprising the steps of:

calculating part or all of contact force between particles based on the particle strains, the imaginary contact area, the normal vector direction, and mechanical properties of particle materials.

7. A computer readable medium having a computer-executable program according to claim 1, wherein one dimension is deleted by replacing the above planes with lines to apply to a planar analysis.

8. A computer readable storage medium having a computer-executable program to simulate physical or chemical phenomena with one or more non-spherical particles and finite elements and with or without spherical particles, and to calculate translational or rotational displacements of particles and element nodes, comprising the steps of:

(a) judging existence of contact between neighbor particles as existence of contact between mathematically-smooth closed surfaces representing each particle shape and size and the following (b) to (e) between two particles under the judged contact condition, (b) assuming an imaginary contact point uniquely the same as when both the closed surfaces are reduced isotropically with the same scale to touch at one point;

(c) assuming an imaginary contact plane to contain the imaginary contact point and to have a same-directional perpendicular as both normal vectors on both reduced closed surfaces at the imaginary contact point;

(d) calculating imaginary contact area using the imaginary contact point and the imaginary contact plane;

(e) calculating characteristic values or matrices between both contact particles about stiffness, transmission resistance, transportation resistance or these inverse, using the imaginary contact point, the imaginary contact plane and the imaginary contact area; and (f2) based on the characteristic values or matrices between both particles, calculating a characteristic matrix between degrees of freedom of many particles and element nodes, solving simultaneous linear equations, and calculating translational or rotational displacements or displacement increments of the particles and element nodes;

and the following sub-steps (k) and (l) in the above step (f2), (k) setting some of translational or rotational degrees of freedom of particles being equal to degrees of freedom of finite element nodes; and (l) adding part or all of the characteristic matrix between degrees of freedom of particles, into a broad-sensed stiffness matrix calculated by a usual finite element method.

9. A computer readable medium having a computer-executable program according to claim 8, wherein particles have degrees of freedom about radiuses, radius-changes or radius-change rates that represent or indicate the sizes of the closed surfaces in three-dimensional directions.

10. A computer readable medium having a computer-executable program according to claim 9, wherein a vector as a product of the characteristic matrix and a vector corresponding to the degrees of freedom of particles, that is, a vector analogous to a broad-sensed force vector in a finite element method, has elements with physical quantity as deviation stresses at rows of degrees of freedom about the radiuses, the radius-changes or the radius-change rates.

11. A computer readable medium having a computer-executable program according to claim 8, further comprising the steps of:

calculating strain contributions to both contacted particles, based on the reducing scale applied in the above step (b); and calculating strain in each particle as a scalar or vector total of the contributed strains of all contact with the neighbor particles.

12. A computer readable medium having a computer-executable program according to claim 11, further comprising the steps of:

calculating part or all of contact force between particles based on the particle strains, the imaginary contact area, the normal vector direction, and mechanical properties of particle materials.

13. A computer readable medium having a computer-executable program according to claim 8, wherein one dimension is deleted by replacing the above planes with lines to apply to a planar analysis.

* * * * *